United States Patent
Andersen et al.

(10) Patent No.: US 10,244,497 B2
(45) Date of Patent: Mar. 26, 2019

(54) CLOCK SYNCHRONIZATION WITH HYSTERESIS STATE SWITCHING

(71) Applicant: Telefonaktiebolaget LM Ericsson (publ), Stockholm (SE)

(72) Inventors: Ib Nørholm Andersen, Skogås (SE); Srdjan Carevic, Zagreb (HR)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 191 days.

(21) Appl. No.: 15/119,984

(22) PCT Filed: Feb. 28, 2014

(86) PCT No.: PCT/EP2014/053935
§ 371 (c)(1),
(2) Date: Aug. 18, 2016

(87) PCT Pub. No.: WO2015/127983
PCT Pub. Date: Sep. 3, 2015

(65) Prior Publication Data
US 2017/0070969 A1   Mar. 9, 2017

(51) Int. Cl.
*H04W 56/00* (2009.01)
*H04J 3/06* (2006.01)
*H04L 12/26* (2006.01)

(52) U.S. Cl.
CPC ....... *H04W 56/0015* (2013.01); *H04J 3/0641* (2013.01); *H04J 3/0661* (2013.01); *H04L 43/16* (2013.01)

(58) Field of Classification Search
None
See application file for complete search history.

(56) References Cited

U.S. PATENT DOCUMENTS 8,254,325 B2 *   8/2012  Niewczas ............ H04B 1/7085
                                              370/252
2009/0141699 A1 *  6/2009  Goshen ................ H04J 3/0664
                                              370/350
(Continued)

FOREIGN PATENT DOCUMENTS

EP     1659709 A2      5/2006
WO  2013163793 A1    11/2013

OTHER PUBLICATIONS

Gayraud, R., et al., "Network Time Protocol (NTP) Server Option for DHCPv6", Internet Engineering Task Force (IETF), Request for Comments: 5908, Jun. 1, 2010, pp. 1-10, IETF.
(Continued)

*Primary Examiner* — Chi H Pham
*Assistant Examiner* — Vladislav Y Agureyev
(74) *Attorney, Agent, or Firm* — Sage Patent Group

(57) ABSTRACT

The invention refers to synchronizing a client clock of a network node to a reference clock, wherein the network node performs the steps of receiving from the reference clock synchronization data, determining a comparison value indicative of a degree of deviation of the client clock with respect to the reference clock, and determining a synchronization state (S1, S2) out of a free running state (S1) and a locked state (S2), based on the comparison value, a first threshold (TH1), and a second threshold (TH2). The invention further refers to a telecommunication node (21) and a computer program.

10 Claims, 7 Drawing Sheets

(56) References Cited

U.S. PATENT DOCUMENTS

| | | | | |
|---|---|---|---|---|
| 2009/0147806 A1* | 6/2009 | Brueckheimer | H04J 3/0667 | 370/503 |
| 2010/0067632 A1* | 3/2010 | Jia | H04L 25/0204 | 375/371 |
| 2010/0158183 A1* | 6/2010 | Hadzic | H03L 7/087 | 375/376 |
| 2010/0167679 A1* | 7/2010 | Lopez | H04L 25/0216 | 455/296 |
| 2012/0069943 A1* | 3/2012 | Lim | H04J 3/0641 | 375/371 |
| 2012/0300859 A1* | 11/2012 | Chapman | H04J 3/0667 | 375/257 |
| 2013/0039389 A1* | 2/2013 | Wang | H04B 1/712 | 375/147 |
| 2013/0308660 A1* | 11/2013 | Huang | H04J 3/0664 | 370/518 |
| 2014/0085141 A1* | 3/2014 | Geva | H04J 3/0644 | 342/357.51 |
| 2015/0092793 A1* | 4/2015 | Aweya | H04J 3/0685 | 370/503 |
| 2015/0244513 A1* | 8/2015 | Hartman | H04J 3/06 | 370/350 |
| 2015/0295702 A1* | 10/2015 | Ogawa | H04J 3/0638 | 370/324 |

OTHER PUBLICATIONS

IEEE Intstrumentation and Measurement Society, "IEEE Standard for a Precision Clock Synchronization Protocol for Networked Measurement and Control Systems", IEEE Std 1588-2008, Jul. 24, 2008, pp. 1-289, IEEE.

Haberman, B., et al., "Network Time Protocol Version 4: Autokey Specification", Internet Engineering Task Force (IETF), Request for Comments: 5906, Jun. 1, 2010, pp. 1-59, IETF.

Mills, D., et al., "Network Time Protocol Version 4: Protocol and Algorithms Specification", Internet Engineering Task Force (IETF), Request for Comments: 5905, Jun. 1, 2010, pp. 1-111, IETF.

* cited by examiner

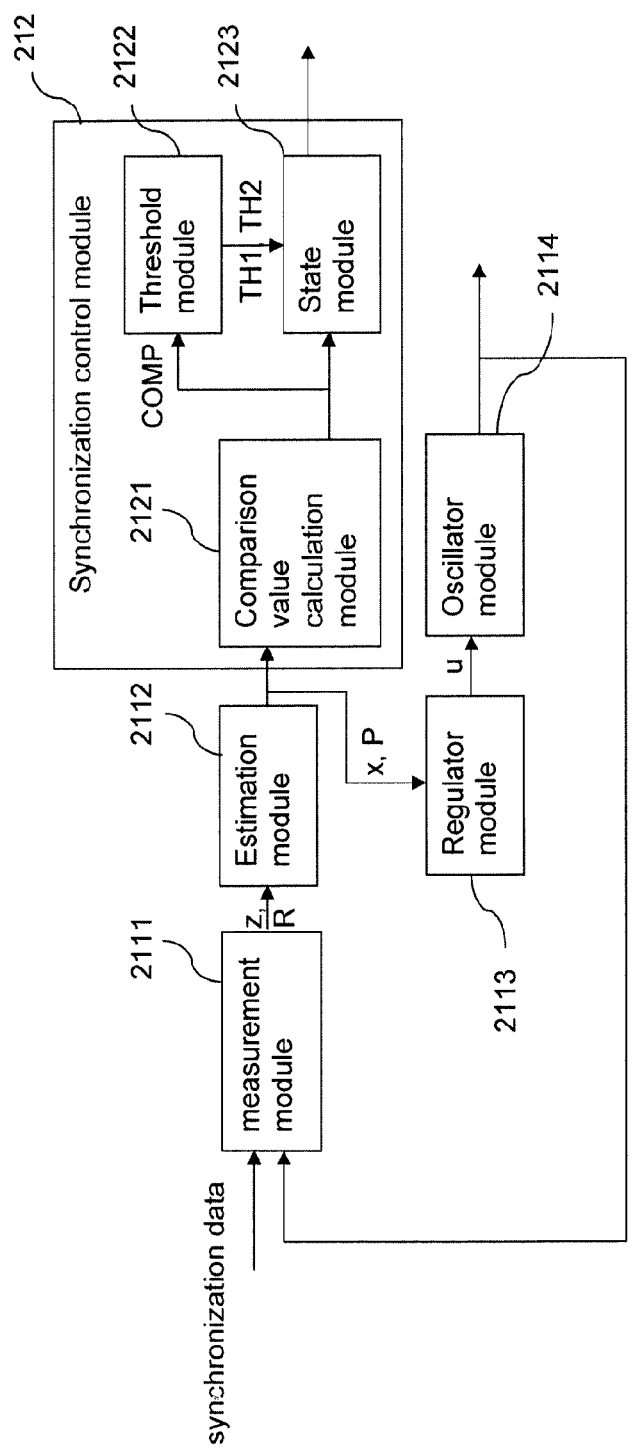

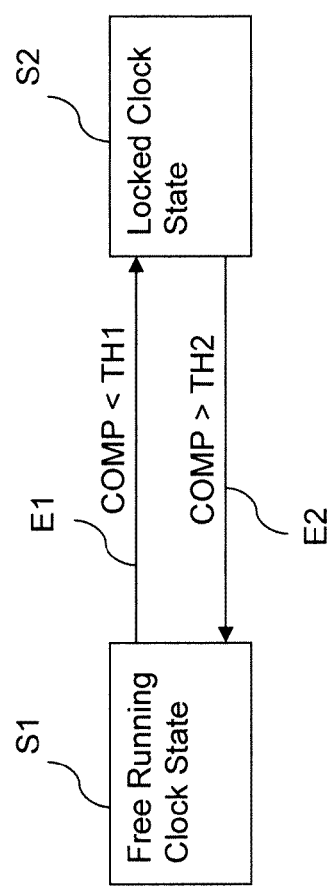

CLOCK SYNCHRONIZATION WITH HYSTERESIS STATE SWITCHING

TECHNICAL FIELD

The present invention generally relates to clock synchronization in a telecommunication network, and more specifically to synchronizing a clock of a telecommunication network node to a reference clock.

BACKGROUND

In telecommunication networks, communicating nodes may need to have a common time base in order to be able to properly communicate. Thereto, synchronization between different clocks may be performed between various nodes of these networks.

Specifically, base stations of a radio access network are synchronized to a time or frequency reference. Any clock of any device that can provide accurate frequency and/or time may serve as reference clock. The reference clock can be another network node, a separated time server (NTP, PTP), a GPS receiver.

One protocol used is the so-called Network Time Protocol, NTP, specified by the Internet Engineering Task Force, IETF, and described in a suite of specification documents, such as rfc 5905, rfc 5906, rfc 5907, and rfc 5908. Another protocol is the so-called Precision Clock Synchronization Protocol of IEEE, e,g, described in the document IEEE 1588, version 2, titled "IEEE Standard for a Precision Clock Synchronization Protocol for Networked Measurement and Control Systems"

NTP offers different synchronization modes. In one of these modes, an NTP client synchronizes its clock to a remote NTP server. Therein, clock synchronization is a continuous process, resulting in a sequence of measurements resulting in a clock adjustment. Thereto, the client may repeatedly calculate a round-trip delay time and an offset with respect to the server. These values may be subject to processing and filtering. The client clock is then adjusted to steadily reduce the offset.

After a start or restart of a base station, the base station clock, in the following also being referred to as client clock, is in a so-called free running state, until the client clock meets certain (predefined or specified) accuracy requirements. Thereto, the base station may comprise a synchronization control module to decide when the clock meets the specified accuracy requirements. The synchronization control module thereto may receive clock estimates from an estimation filter, e.g. a so-called Kalman filter, and may determine a comparison curve indicative of a degree of deviation between the reference and the client clock that can be compared with a threshold. When the comparison curve is below the threshold, the synchronization control module may declare the state to be locked. Otherwise the synchronization control module may declare the state to be free-running.

As soon as the accuracy requirements are met, the clock is regarded as synchronized to the reference and the node may start to handle the traffic. As long as the clock is in the free running state, the base station may not handle radio network data traffic.

Measurements of the time difference between a client clock and a reference are subject to noise. Low-noise measurements may arise with GPS as reference, where quantization noise is typically a few nanoseconds, and the GPS receiver gives a few tens of nanoseconds. High-noise measurements may arise when timing information is transferred through a packet switching network, where a packet delay variation, PDV, may add a noise of microseconds, or milliseconds, or even more.

Due to the noise, the comparison curve may vary around the threshold such that the clock's state may toggle between free running and locked mode until it finally settles in the locked mode. In case of high noise, it may happen that the clock's state toggles for a quite long period of time and in a worst case may never settle in the locked mode.

The consequence of the toggling is that the network node that already has started handling traffic may have to be stopped from handling the traffic. E.g. if the network node is a radio base station, already established calls may be disconnected. Disconnecting already established calls may be however worse than a later start of traffic handling e.g. if neighbor nodes are capable of handling the traffic without interrupts until the toggling radio base station is finally synchronized.

SUMMARY

It is an object of the present invention to provide an improved synchronization state control.

This object is achieved by the independent claims. Advantageous embodiments are described in the dependent claims and by the following description.

According to embodiments of the invention, a data communication network node, in the following being referred to as network node, associated to a client clock performs synchronization with a master or reference clock, e.g. associated to a reference clock server. Thereto, the network node receives a plurality of subsequent synchronization signals, e.g. GPS timing signals or synchronization data packets comprising timing information. Based on this information, the client clock measures the time difference between its own time and the time of reference. These measurements are subject to noise, e.g. due to Packet Delay Variation, PDV as discussed above. Based on the measurements, the network node estimates the time and/or frequency error of the network node.

The network node may comprise an estimator, e.g. a Kalman filter that estimates both time and frequency errors and keeps track of their covariance matrix. The estimated errors may significantly reduce the noise compared to the measurements.

The network node may further comprise a synchronization control module that calculates a comparison value indicative of an estimated time or frequency deviation between client and reference clock (plus a safety margin). Based on a comparison of the comparison value with a certain threshold, the synchronization control module may decide whether the quality of time and/or frequency of the client is sufficient to perform network operations. As an example, the comparison value may be the absolute value of the estimated relative frequency error plus a safety margin (e.g. of three standard deviations of the estimate).

The network node may comprise two states of synchronization. In a first state, in the following also being referred to as free running state, the network node is not sufficiently synchronized and may not perform network operations. In a second state, in the following also being referred to as locked mode, the network node is sufficiently synchronized and may perform network operations.

The network node provides a first threshold, in the following also being referred to as entry threshold and a second threshold, in the following also being referred to as exit threshold. The network node repeatedly compares the comparison value with one of the thresholds depending on its synchronization state:

- if the network node is in the free running mode, it compares the comparison value with the entry threshold. If the comparison value is below (or equal to) this threshold, the network node enters the locked mode.
- If the network node is in the locked mode, it compares the comparison value with the exit threshold. If the comparison value is above (or equal to) this threshold, the network node enters the free running mode.

In order to reduce or avoid a frequent switching or toggling between both states, the entry threshold may be chosen to be smaller than the exit threshold (thus enabling a hysteresis switching).

As discussed above, the comparison values are calculated based on estimated time and/or frequency deviations. The most pronounced state toggling problems arise when timing information comes from synchronization packets sent over the network. The delay time between sending and receiving of packets (travel time) shows a variation over time depending e.g. on the network structure and an actual network load. This variation is also being referred to as packet delay variation, PDV. Thus, the comparison values are affected by PDV. The higher the PDV, the higher the short time variation will be of the comparison values, in the following also being referred to as (comparison value) peak amplitude. In order to avoid a state toggling, the entry and exit threshold may be chosen such that the difference between both thresholds is as great as or greater than the maximum assumed peak amplitude within the network.

In an embodiment, at least one of the thresholds is made adaptive to an actual PDV. By way of example, the exit level for returning to free running state is chosen as a fixed value according to required clock accuracy, and the entry threshold is calculated as a function of an actual variation of the comparison value that may be significantly smaller than the maximum assumed variation. Therewith, the hysteresis width adapted to the actual PDV. This allows minimizing the hysteresis without increasing a risk that the synchronization state toggles. This may significantly decrease an out of service time of the network node compared to using a fixed hysteresis.

The present invention also concerns computer programs comprising portions of software codes in order to implement the method as described above when operated by a respective processing unit of appropriate nodes, e.g. a radio base station of a radio access network. The computer program can be stored on a computer readable medium. The computer-readable medium can be a permanent or rewritable memory within the user device or the recipient device or located externally. The respective computer program can be also transferred to the node for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE FIGURES

FIG. 3 shows an exemplary more detailed block diagram of a phase locked loop and a synchronization control module, FIG. 4 shows an exemplary state transition diagram with respect to synchronization states of the first node.

DETAILED DESCRIPTION

Figure 1:
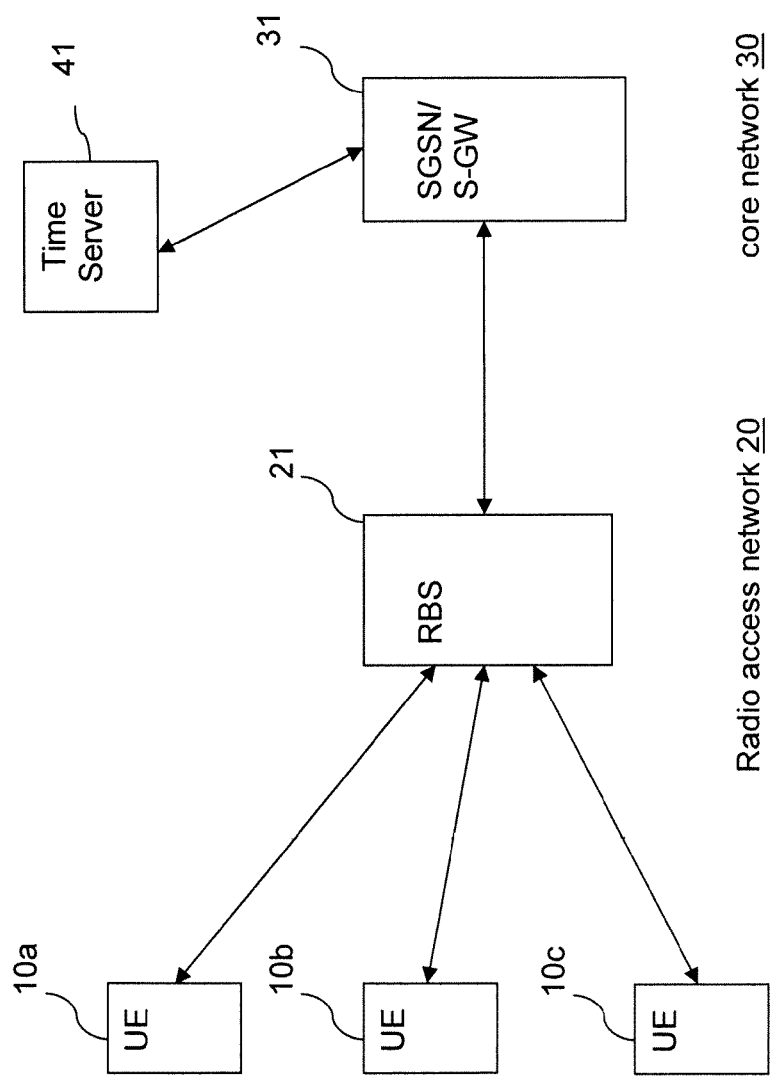
FIG. 1 shows a principal block diagram depicting exemplary telecommunications network nodes comprising a first node comprising a client clock and a second node comprising or associated to a reference clock performing clock synchronization.

FIG. 1 shows a block diagram comprising an exemplary plurality of user terminals 10a, 10b, 10c connected to a radio telecommunications network 1. The telecommunications network by way of example shows a radio access network RAN 20 and a core network, CN 30. Further, as an exemplary node of the RAN 20, a radio base station, RBS 21, and as an exemplary node of the core network, an gateway node 31 (e.g. a Serving CPRS Support Node, SGSN, or serving gateway, S-GW) is depicted. Further, a time server 41 is depicted that may be part of the core network as shown in the figure, or part of the RAN, or external to both networks.

By way of example, the time server being part of the RAN or the core network is being controlled by the telecommunications network provider. Alternatively, the time server may be any public or private node internal or external to the RAN that is able to communicate with the RBS 21 by means of defined synchronization protocols as discussed in more details in the following.

The RBS 21 may support any 3GPP technology, e.g. based on one or a plurality of: GSM/EDGE, WCDMA/HSPA, and LTE such as provided by the so-called RBS 6000 family of the applicant. As an example for LTE, the RBS 21 may be a so-called evolved node B, eNB.

When starting RBS operation, RBS 21 may contact one of a plurality of available reference clocks (e.g. selecting one out of a plurality up of 8 PTP or NTP references) to initiate a time/clock synchronization. Depending on the type of protocols to be used, e.g. PTP, NTP, SNTP as discussed above, defined initialization packets may be exchanged before starting the synchronization process.

In the following, embodiments of the invention will be described focussing on the NTP or SNTP protocol.

Figure 2:
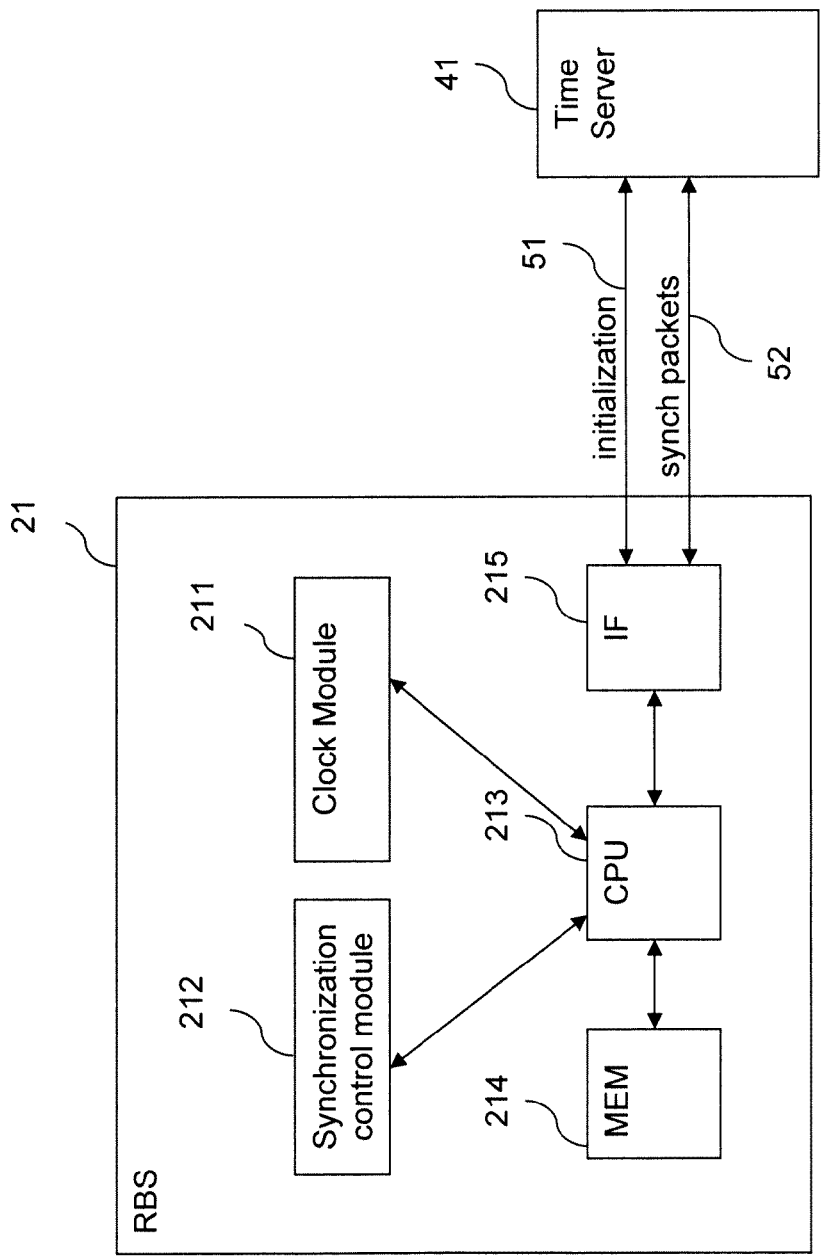
FIG. 2 shows a block diagram depicting exemplary functional blocks of the first node of FIG. 1.

FIG. 2 shows a more detailed block diagram of RBS node 21 showing exemplary functional modules comprising a clock module 211, a synchronization control module 212, a processor 213, a memory 214 and a synchronization interface 215.

The clock module 211 comprises or controls the client clock that may be in principle realized as a controllable oscillator, e.g. a voltage controlled oscillator. The synchronization control module 212 determines a synchronization state with respect to a synchronization level between the client clock and the reference clock. The synchronization interface 215 performs an exchange of messages with the time server 41 according to a chosen synchronization protocol as described in the background section. The memory 214 stores program code to be executed in the processor 213 to perform synchronization functions described in the following.

After having exchanged synchronization initialization packets 51 (e.g. information about the clock class, required clock accuracy in case of PTP), the RBS 21 may regularly send timing or synchronization packets 52 at a certain packet rate (e.g. at a rate of 1 packet per second) over the synchronization interface 215 and store a corresponding time stamp of transmission with respect to the client clock in the memory. Depending on the network architecture, the synchronization packets may be exchanged over one or a plurality of intermediate network nodes. Depending e.g. on the load of these nodes, a certain packet delay may be introduced, wherein the delay may vary over the time.

The time server 41 returns the packets 52 with a first receive time stamp and a second transmit time stamp with respect to the reference clock. The synchronization interface 215 may finally add a second receive time stamp to each received synchronization packet. The packets each comprising receive and transmit time stamps both with respect to the client clock and the reference clock are processed by the processor 213 to calculate a comparison value. Such calculation may be performed in several steps as shown in the following FIG. 3 and described below.

FIG. 3 shows an exemplary functional structure of a phase locked loop implemented in the clock module 211 and the synchronization control module 212 comprised by the RBS 21 of previous figures. The phase locked loop may comprise a measurement module 2111, an estimation module 2112, a regulator 2113, and an oscillator module 2114. Further the synchronization control module of FIG. 2 exemplary comprises a comparison value calculation module 2121, threshold module 2122 and a state module 2123. The measurement module 2111 measures the time and/or frequency difference z between the client clock and the reference clock based on synchronization data received from the reference clock and feedback information from the oscillator module 2114 (client clock). The estimation module 2112, e.g. realized as a Kalman filter, maps the measurements z on estimates x of the difference between client and reference. The Kalman filter also uses the measurement variance R and updates the covariance matrix P of the estimate x in the mapping process. The regulator 2113 maps the estimate and its variance onto frequency and/or time increments u to the oscillator 2114 (e.g. realized as voltage controlled oscillator, VCO).

The synchronization control module 212 decides when the clock meets specified accuracy requirements such that the RBS 21 may start to operate (i.e. handling network traffic). In order to determine whether the client clock is sufficiently synchronised, the synchronization control module 212 may determine an actual synchronization state out of two states of synchronization as shown in following FIG. 4. In a first state, also being referred to as free running state S1, the RBS 21 is not sufficiently synchronized and may not perform network operations; e.g. handling data traffic between the UEs 10a, 10b and 10c and the core network. In a second state, also being referred to as locked state S2, the RBS 21 is sufficiently synchronized and may perform network operations.

Thereto, the comparison value calculation module 2121 calculates a comparison value COMP indicative of a degree of deviation, (e.g. of an actual time or a (relative) frequency deviation) between the client clock and the reference clock as a function of estimations (e.g. of an estimated frequency deviation $x_f$ and its variance $P_{ff}$) provided by the estimation module 2112 plus some safety margin. For example, a typical safety margin can be three standard deviations. As an example, a comparison value for a frequency deviation (as e.g. used in the FIG. 5a-5c) may be calculated as COMP=log ($|x_f|+3\sqrt{P_{ff}}$), wherein $P_{ff}$ is the estimated variance of the frequency difference estimate $x_f$.

The threshold module 2122 provides a first threshold, also being referred to as entry threshold TH1 and a second threshold, also being referred to as exit threshold TH2, such values e.g. being stored in the memory 214. As being discussed in the following, the thresholds TH1 and TH2 may be fixed preconfigures values. Alternatively, as being discussed in the following, at least one of the thresholds, e.g. the entry threshold, may be adapted to actual properties of the comparison value during the synchronization process. In order to determine whether the client clock is sufficiently synchronised, the state module 2123 may determine an actual synchronization state out of two states of synchronization as shown in FIG. 4. In a first state, also being referred to as free running state S1, the RBS 21 is not sufficiently synchronized and may not perform network operations; e.g. handling data traffic between the UEs 10a, 10b and 10c and the core network. In a second state, also being referred to as locked state S2, the RBS 21 is sufficiently synchronized and may perform network operations.

The state module 2123 repeatedly performs a comparison of the calculated comparison value COMP with one of the thresholds depending on its actual synchronization mode or state:

if the network node is in the free running mode, it compares the comparison value COMP with the entry threshold TH1. If the comparison value COMP is below (or equal to) this threshold, the RBS 21 performs a first state change E1 to enter the locked mode.

If the network node is in the locked mode, it compares the comparison value with the exit threshold TH2. If the comparison value is above (or equal to) this threshold, the RBS performs a second state change E2 to enter the free running mode.

Figure 5A:
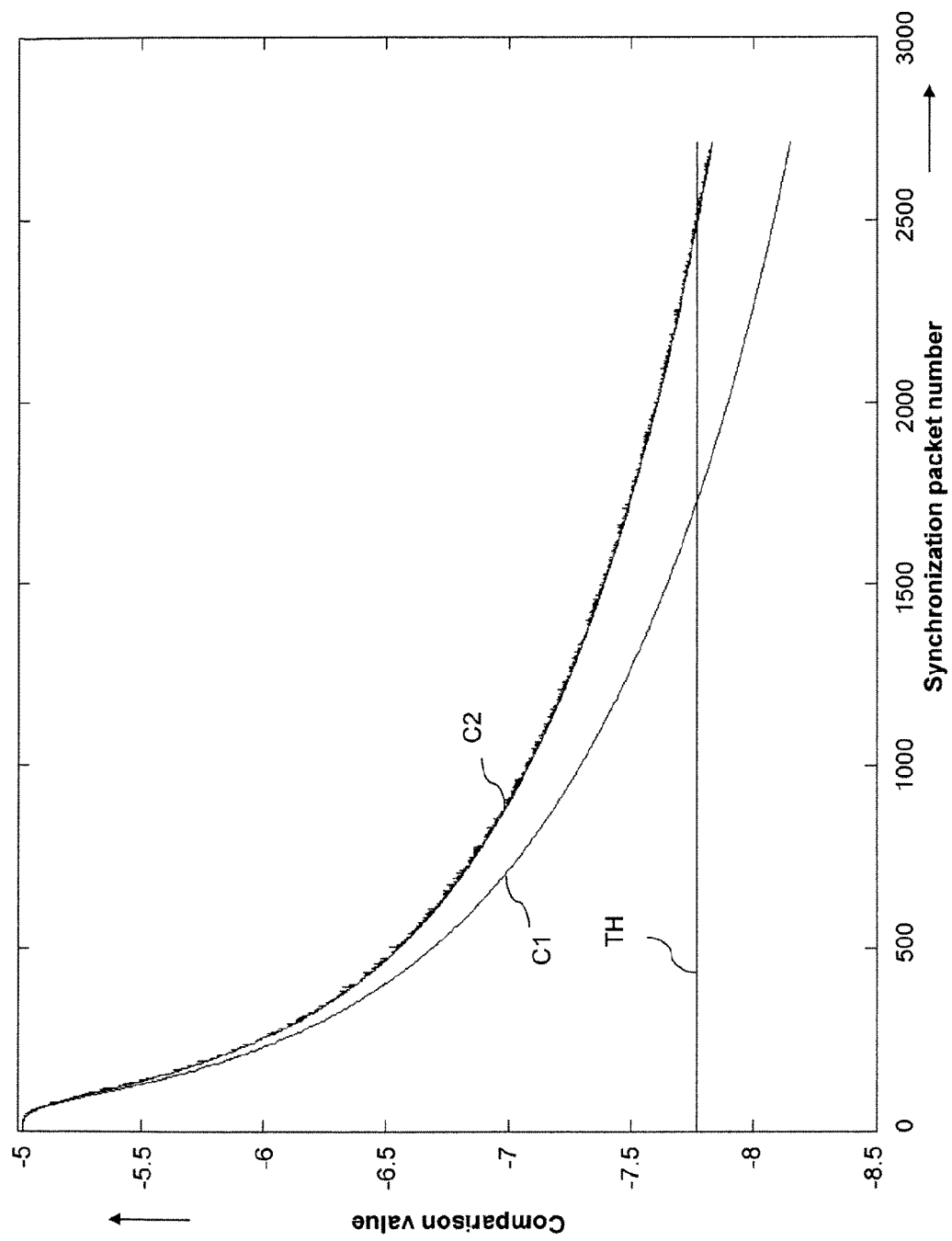
FIG. 5a shows a first diagram depicting exemplary curves representing comparison values representing a deviation between the reference clock and the client clock and a first constant threshold curve to be used to determine synchronization states.

FIG. 5a shows a diagram with two exemplary (comparison) curves C1 and C2 of comparison values COMP=log ($|x_f|+3\sqrt{P_{ff}}$) over the synchronization packet number n (and hence over the time) from the moment of an RBS restart.

Further an exemplary threshold TH is depicted having a static value of around the value −7.7. The first curve C1 is associated to a low PDV compared to a rather high PDV associated to the second curve C2. According to the example shown here, the first curve C1 decreases sharply over the time and reaches the threshold TH around packet number 1750. As far as can be seen in this example, there is no multiple crossing of the threshold; thus no state togging occurs after the entry of the frequency locked state. Differently the second curve C2 converges more slowly passing the threshold TH only around packet number 2500.

Figure 5B:
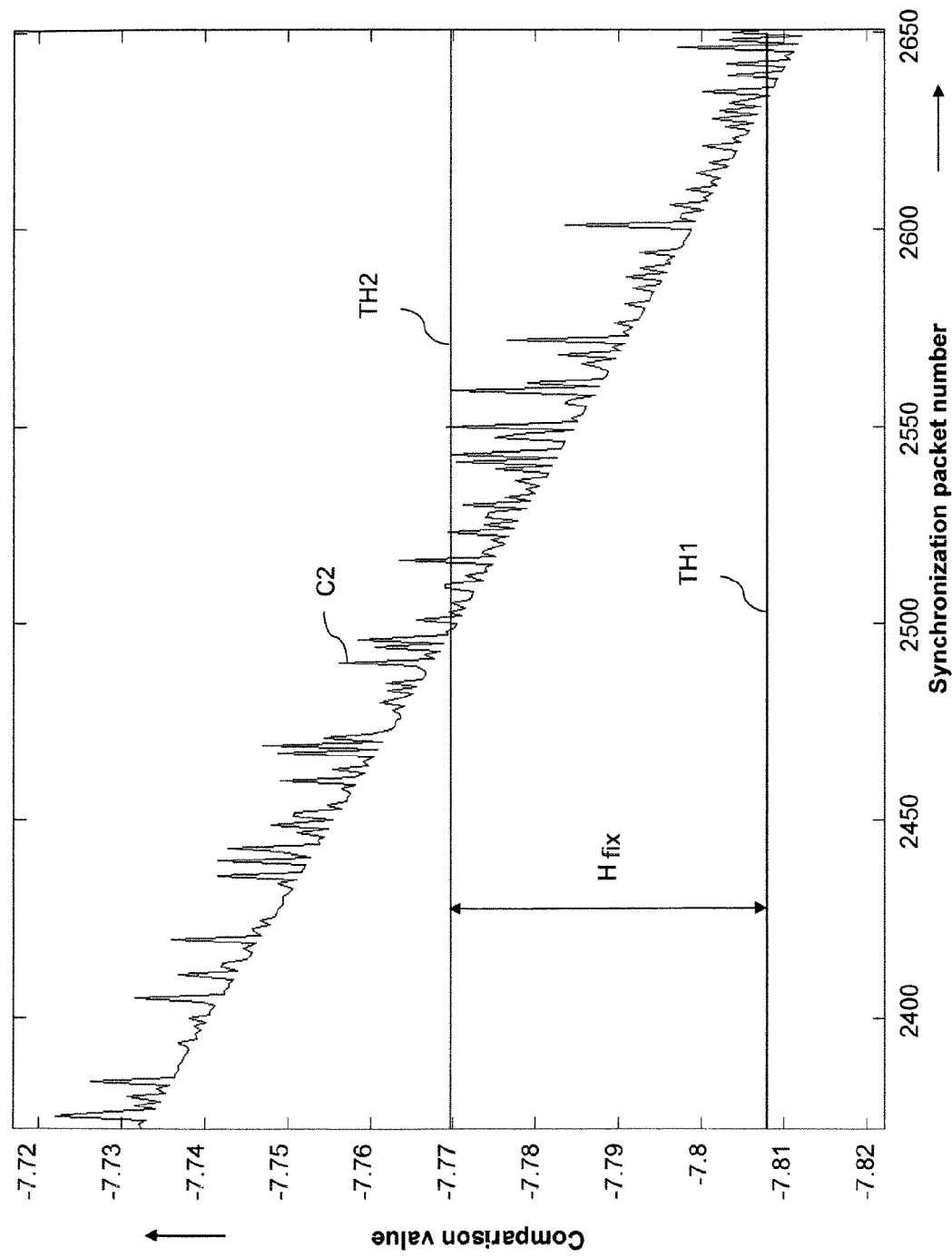
FIG. 5b shows a second diagram depicting a section of an exemplary curve according to FIG. 5a and a constant hysteresis to be used to determine synchronization states.

FIG. 5b shows a section of FIG. 5a showing the second curve C2 in the range between packet number 2350 and 2650. It can be observed that the curve is covered with peaks. By way of example, an entry threshold TH1 and an exit threshold TH2 are depicted at exemplary static values of around −7.81 and −7.77 respectively. The exit threshold TH2 may correspond to a required upper bound on the frequency deviation.

It can be seen that the peaks (in combination with the slower convergence) lead to multiple crossings of the second curve C2 with both thresholds. The entry threshold TH1 in this example is chosen such that after the second curve C2 crosses the entry threshold TH1 for the first time (at around packet number 2570) the comparison value becomes small enough so that later peaks won't reach the exit threshold TH2, and thus a state toggling is mostly avoided. Both thresholds TH1 and TH2 constitute a fixed hysteresis as discussed above:

$$H_{fix}=TH2-TH1$$

It can be seen that the hysteresis $H_{fix}$ has to be as big as the highest absolute peak of the comparison curve to avoid any state toggling, thus leading to a delay in entering the locked state.

Figure 5C:
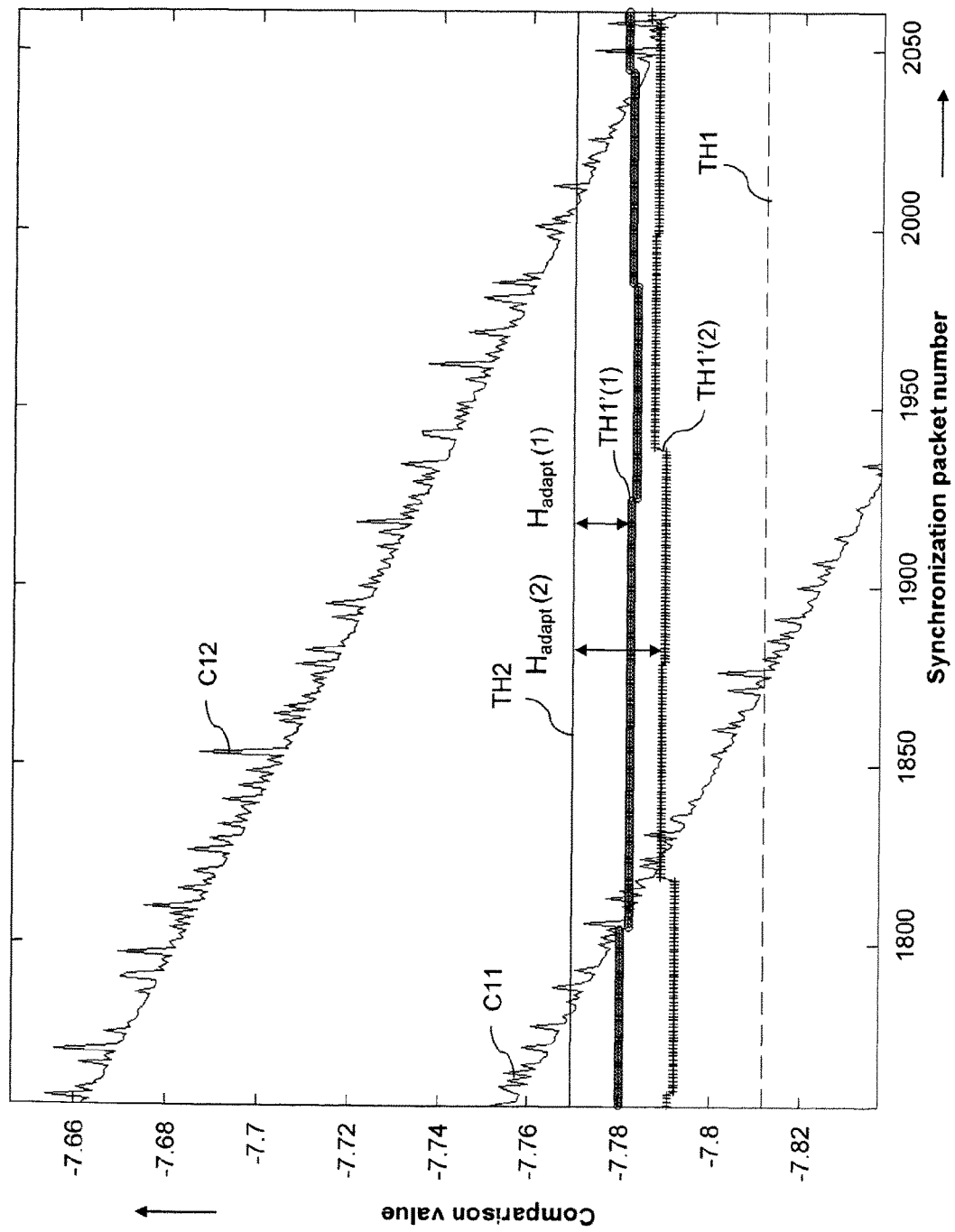
FIG. 5c shows a third diagram depicting further exemplary synchronization comparison values and an adaptive hysteresis to be used to determine synchronization states.

The following FIG. 5c illustrates a further embodiment employing a variable entry threshold TH1' that may be calculated as a function of an actual comparison value variation, e.g. caused by PDV.

In the following, assuming that the exit threshold TH2 is fixed (according to given accuracy requirements) whereas the entry threshold is a function of an actual comparison value variation the hysteresis can be expressed as:

$$H_{adapt}=TH2-TH1'(COMP)$$

Since the peak amplitudes of the curves shown in previous figures depend on the actual PDV (i.e. reflecting current load of intermediate network nodes in the telecommunication network), the amplitude values can be used for determining the variable or adaptive entry threshold TH1' for entering the locked state. The smaller the actual PDV, the smaller is the hysteresis $H_{adapt}$. Thus the hysteresis $H_{adapt}$ in the above example is a positive value depending on the (actual) PDV. Since PDV is an example of measurement noise, the peak amplitudes in general depend on total measurement noise thus hysteresis $H_{adapt}$ depends on total measurement noise. In order to avoid a frequent change of the hysteresis, some processing or filtering may be used to obtain the adaptive entry threshold TH1', e.g. performing any kind of averaging (recursive averaging, sliding window averaging).

In an embodiment, to avoid a frequent adaptation of the threshold TH1' a moving window averaging may be used (a new window of the specified width m starts after the previous window with width m). Therein a number of m samples of the deviation curve may be examined to determine the entry threshold TH1'. The amplitude of the maximum peak within the window may be used to determine the next entry threshold TH1'.

In an embodiment, in order to improve a resistance to peak disturbances in the network, instead of using the amplitude of the maximum peak only, a certain subset, e.g. a certain number of the highest peaks, all peaks with amplitudes above a certain value, or all peaks of the window are used to determine the entry threshold. The amplitude of these peaks may be subject to any filtering, e.g. window averaging or recursive averaging, to determine the entry threshold.

In order to ensure lower jumps of the entry threshold, an averaging over a plurality of the windows may be performed, e.g. calculating the hysteresis as a function of the last two or more windows or any certain number of previous windows or any kind of recursive averaging.

FIG. 5c shows examples of adaptive entry thresholds TH1'(1) and TH1'(2) associated to further two curves C11 and C12 associated each to different exemplary comparison value variations, e.g. caused by PDV as discussed above. The first adaptive threshold TH1'(1) is associated to curve C11 with lower variation while the second adaptive threshold TH1'(2) is associated to curve C12 with higher variation. Horizontal line TH2 represents the exit threshold for entering the free running state according to FIG. 5b. For comparison, dashed horizontal line TH1 represents the fixed value entry threshold according to FIG. 5b. FIG. 5c shows that for both cases, each the adaptive hysteresis $H_{adapt}$ (1) and $H_{adapt}$ (2) is far smaller than the fixed hysteresis H according to FIG. 5b. In other words, any state toggling can be avoided with far smaller hysteresis, if the hysteresis is made adaptive to the comparison value variation. Hence, entering the frequency locked state will be reached much earlier with the smaller adaptive hysteresis value. For the shown example of first curve C11, the delay reduction will be around 70 synchronization packets. E.g. for a packet rate of 1 per second, the delay reduction is around 70 seconds in this example.

By implementing an adaptive hysteresis being made dependent on the actual comparison value variation, the hysteresis may be kept as low as possible. Out of service times after a start or re-start of a telecommunication node to be synchronized to a network clock can be reduced in comparison with an application of a fixed hysteresis, without increasing a danger of running into toggling node states.

The invention claimed is:

1. A method of synchronizing a client clock of a network node to a reference clock, the method comprising the network node:
    receiving, from the reference clock, synchronization data indicative of a time and/or a frequency of the reference clock;
    determining a comparison value indicative of a degree of a time and/or a frequency deviation of the client clock with respect to the reference clock;
    determining a synchronization state, out of a free running state and a locked state, based on the comparison value, a first threshold, and a second threshold, wherein the first threshold is calculated as a function of the second threshold and a maximum assumed short term variation, wherein the second threshold is a fixed value, and wherein the first threshold is determined as function of a variation of the comparison value originating from measurement noise;
    estimating, as a function of the synchronization data, a deviation of time and/or frequency of the client clock from the reference clock, and a covariance value associated to the deviation;
    determining the comparison value as a function of the estimated deviation and the covariance value;
    comparing the comparison value with the first threshold, wherein a first state transition, from the free running state to the locked state, is performed as a result of the comparison of the comparison value with the first threshold; and
    comparing the comparison value with the second threshold, wherein a second state transition is performed as a result of the comparison of the comparison value with the second threshold.

2. The method of claim 1, wherein the first threshold is smaller than the second threshold.

3. The method of claim 1, wherein the first threshold is an adaptive value based on measurement variations of the comparison value.

4. The method of claim 1, wherein the second threshold is chosen according to a predefined clock synchronization requirement.

5. The method of claim 1, wherein the first threshold is determined as function of a variation of the comparison value and the second threshold.

6. The method of claim 1, wherein the first threshold is calculated by subtracting the maximum assumed short term variation from the second threshold.

7. The method of claim 1, wherein the maximum assumed short term variation is determined based on an observation of peak amplitudes of the comparison values over a certain set of synchronization data.

8. The method of claim 1, wherein the node starts network operations in response to a state transition from the free running state to the locked state, and stops network operations in response to a state transition from the locked state to the free running state.

9. A network node adapted to communicate with a reference clock to synchronize the client clock to the reference clock, the network node comprising:
the client clock;
an interface circuit configured to receive synchronization data indicative of a time of the reference clock;
a processing circuit configured to determine, as a function of the synchronization data, a comparison value indicative of a degree of a time and/or a frequency deviation of the client clock with respect to the reference clock;
estimate, as a function of the synchronization data, a deviation of time and/or frequency of the client clock from the reference clock, and a covariance value associated to the deviation; and
a synchronization control circuit configured to determine a synchronization state, out of a free running state and a locked state, based on the comparison value, a first threshold, and a second threshold, wherein the first threshold is calculated as a function of the second threshold and a maximum assumed short term variation, wherein the second threshold is a fixed value, and wherein the first threshold is determined as function of a variation of the comparison value originating from measurement noise;
determine the comparison value as a function of the estimated deviation and the covariance value;
compare the comparison value with the first threshold, wherein a first state transition, from the free running state to the locked state, is performed as a result of the comparison of the comparison value with the first threshold; and
compare the comparison value with the second threshold, wherein a second state transition is performed as a result of the comparison of the comparison value with the second threshold.

10. A computer program product stored in a non-transitory computer readable medium for synchronizing a client clock of a network node to a reference clock, the computer program product comprising software instructions which, when run on one or more processing circuits of the network node, causes the network node to:
receive, from the reference clock, synchronization data indicative of a time and/or a frequency of the reference clock;
determine a comparison value indicative of a degree of a time and/or a frequency deviation of the client clock with respect to the reference clock;
determine a synchronization state, out of a free running state and a locked state, based on the comparison value, a first threshold, and a second threshold, wherein the first threshold is calculated as a function of the second threshold and a maximum assumed short term variation, wherein the second threshold is a fixed value, and wherein the first threshold is determined as function of a variation of the comparison value originating from measurement noise;
estimate, as a function of the synchronization data, a deviation of time and/or frequency of the client clock from the reference clock, and a covariance value associated to the deviation;
determine the comparison value as a function of the estimated deviation and the covariance value;
compare the comparison value with the first threshold, wherein a first state transition, from the free running state to the locked state, is performed as a result of the comparison of the comparison value with the first threshold; and
compare the comparison value with the second threshold, wherein a second state transition is performed as a result of the comparison of the comparison value with the second threshold.

* * * * *